(12) United States Patent
Chen

(10) Patent No.: US 7,245,600 B2
(45) Date of Patent: Jul. 17, 2007

(54) METHOD AND APPARATUS FOR DETERMINING REVERSE LINK LOAD LEVEL FOR REVERSE LINK DATA SCHEDULING IN A CDMA COMMUNICATION SYSTEM

(75) Inventor: Tao Chen, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 837 days.

(21) Appl. No.: 10/011,519

(22) Filed: Nov. 5, 2001

(65) Prior Publication Data

US 2003/0086397 A1    May 8, 2003

(51) Int. Cl.
*H04B 7/216*    (2006.01)
(52) U.S. Cl. .................................. 370/335; 370/342
(58) Field of Classification Search ............... None
See application file for complete search history.

(56) References Cited

U.S. PATENT DOCUMENTS 5,914,950 A    6/1999  Tiedemann, Jr. et al.
5,923,650 A    7/1999  Chen et al.
6,058,107 A *  5/2000  Love et al. .................. 370/332
6,680,727 B2 * 1/2004  Butler et al. ................ 375/144
2002/0111158 A1* 8/2002 Tee ............................ 455/421

* cited by examiner

*Primary Examiner*—Doris H. To
*Assistant Examiner*—Thai Hoang
(74) *Attorney, Agent, or Firm*—Thomas Rouse; Thien Nguyen; S. Hossain Beladi

(57) ABSTRACT

In a communication system (100), a method and apparatus provides for determining reverse link load level for reverse link data rate scheduling. The method and apparatus include determining a number of locked fingers (208) on a reverse link signal in a receiver portion (200) of a base station, summing energy per bit or carrier energy over noise plus interference ratio of the reverse link signal at the locked fingers, and determining a reverse link capacity based on the summed energy per bit over noise plus interference ratio. A maximum reverse link data rate supported for a mobile station is determined for the reverse link communication with the base station. After communicating the maximum reverse link data rate to the mobile station, a reverse link data rate from mobile station to the base station is adjusted based on the maximum reverse link data rate.

22 Claims, 5 Drawing Sheets

METHOD AND APPARATUS FOR DETERMINING REVERSE LINK LOAD LEVEL FOR REVERSE LINK DATA SCHEDULING IN A CDMA COMMUNICATION SYSTEM

FIELD

The present invention relates generally to the field of communications, and more particularly, to communications in a cellular communication system.

BACKGROUND

In code division multiple access (CDMA) communication systems, unnecessary and excessive transmission by a user may cause interference for other users in addition to reducing the system capacity. The communication system may provide communication services that include wireless radio transmission of digitized speech, still or moving images, text messages and other types of data. An encoder in a transmitter of the communication system may receive a packet of data for encoding. Each data packet may be transmitted in a time frame. The data rate of data transmitted in each packet may be selected based on one or more parameters. The teachings of issued U.S. Pat. Nos. 5,914,950 and 5,923,650, incorporated by reference herein, and assigned to the assignee of the present application for a patent, provide at least one method of reverse link data rate scheduling based on the system parameters.

Generally, the total reverse link capacity is limited by the total interference generated by the mobile stations. To control and minimize the interference, the transmit power level of the mobile stations is controlled by power control loops. The power level for the reverse link of each mobile station is controlled by an outer loop and an inner loop. The outer loop has a set point relating to the total energy per bit over noise plus interference ratio, $Eb/(No+Io)$, or the total carrier energy over noise plus interference, $Ec/(No+Io)$. The inner loop adjusts the set point based on the reverse link channel condition. The set point may be used for the calculation of the reverse link total load level. Generally, when the set point is set at a higher level, the reverse link power level is also set for a higher level. High power level is used to overcome the interference and noise in the propagation channel. Therefore, the set point is an indication of the power level transmitted by each mobile station. To calculate the load level, which has a direct correlation with the transmit power level, the set point may be used. The calculated reverse link total load level is used for the reverse link data rate scheduling. When the reverse link load level is high in comparison to a low load level, fewer number of mobile stations may receive reverse link data communication at high data rate.

The reverse link signal of the mobile station may be received at several base stations, but not necessarily if the mobile station is communicating or in a soft handoff condition with all the base stations. The signals received at such base stations add to the total reverse link load level. Therefore, the set point in the reverse link outer loop power control does not represent an accurate indication of the total load level.

To this end as well as others, there is a need for a method and apparatus to efficiently determine the reverse link load level for reverse link data rate scheduling in a communication system.

SUMMARY

In a communication system, a method and apparatus provides for determining reverse link load level for reverse link data rate scheduling. The method and apparatus include determining a number of locked fingers on a reverse link signal in a receiver portion of a base station, summing energy over noise plus interference ratio of the reverse link signal at the locked fingers, and determining a reverse link capacity based on the summed energy over noise plus interference ratio. A maximum reverse link data rate supported for a mobile station is determined based on the determined reverse link capacity for the reverse link communication with the base station. After communicating the maximum reverse link data rate to the mobile station, a data rate of the reverse link from the mobile station to the base station is adjusted based on the maximum reverse link data rate. The signal from the mobile station may propagate through different paths. A signal propagated through a path may provide enough signal energy to noise ratio for a finger to lock and remain locked to the signal. The signal propagated through other paths may be unusable at a finger. The energy over noise plus interference ratio of signals propagated through unused paths may also be included in determining the reverse link capacity. The fingers at the base stations involved in a soft handoff condition and geographically close base stations to an Active set of base stations may also be included in determining summed energy over noise plus interference ratio.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, a novel and improved method and apparatus provide for efficient use of communication resources in a CDMA communication system by efficiently determining the reverse link load level for reverse link data rate scheduling. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
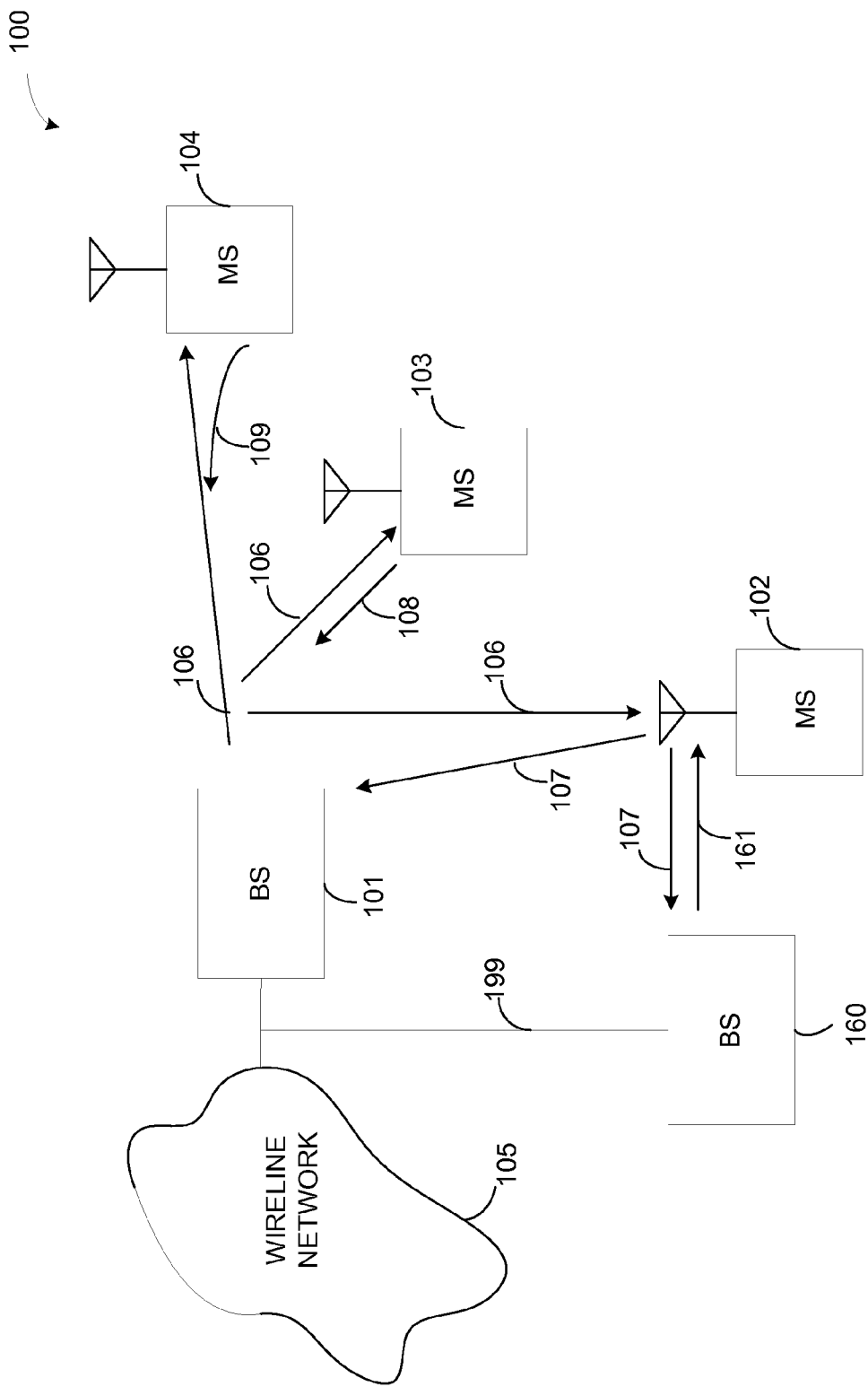
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communication of voice, data or both. Generally, communication system 100 includes a base station 101 that provides communication links between a number of mobile stations, such as mobile stations 102–104, and between the mobile stations 102–104 and a public switch telephone and data network 105. The mobile stations in FIG. 1 may be referred to as data access terminals and the base station as a data access network without departing from the main scope and various advantages of the invention. Base station 101 may include a number of components, such as a base station controller and a base transceiver system. For simplicity, such components are not shown. Base station 101 may also be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102–104 may be summed to form a forward link signal 106. Each of the mobile stations 102–104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102–104 communicate with base stations 101 and 160 via corresponding reverse links. Each reverse link is maintained by a reverse link signal, such as reverse link signals 107–109 for respectively mobile stations 102–104. The reverse link signals 107–109, although may be targeted for a base station, may be received at other base stations.

In a soft handoff situation, base stations 101 and 160 may be simultaneously communicating to a common mobile station. For example, mobile station 102 may be in close proximity to base stations 101 and 160, and may maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. To transmit a data packet to mobile station 102 in soft handoff, base stations 101 and 160 transmit identical information synchronously to the mobile station 102. On the reverse link, both base stations 101 and 160 may attempt to decode the traffic data transmission from the mobile station 102. The propagation channels between the mobile station 102 and base stations 101 and 160 are most likely are not the same. Therefore, the level of the energy over noise plus interference ratio of the reverse link signal received at each base station may be different. The outer loop power control set point is normally the same for all base stations in a soft hand off condition with the mobile station. Therefore, measuring the reverse link efficiency based on the outer loop power control set point for determining the reverse link capacity may lead to inaccurate results. As such, the data rate scheduling of the data communication on the reverse link data may be executed in an efficient manner. The base stations 101 and 160 may also transmit a pilot channel on the forward link to assist the mobile stations in decoding various channels on the forward link.

Each mobile station maintains an Active list of base stations that are suitable for maintaining a communication link. The signal from a base station must meet certain threshold to qualify for being a member of the Active set. The threshold relates to the quality of the signal received from the base station. The mobile station monitors the signals transmitted from the base stations in the Active list. The base stations in the Active list may or may not be geographically close to the mobile station. Therefore, the signals from the mobile station may be received at base stations that are not in the Active set. The received signal at such a base station adds to the reverse link load level, even though the base station is not in the Active set of base stations at the mobile station.

Figure 2:
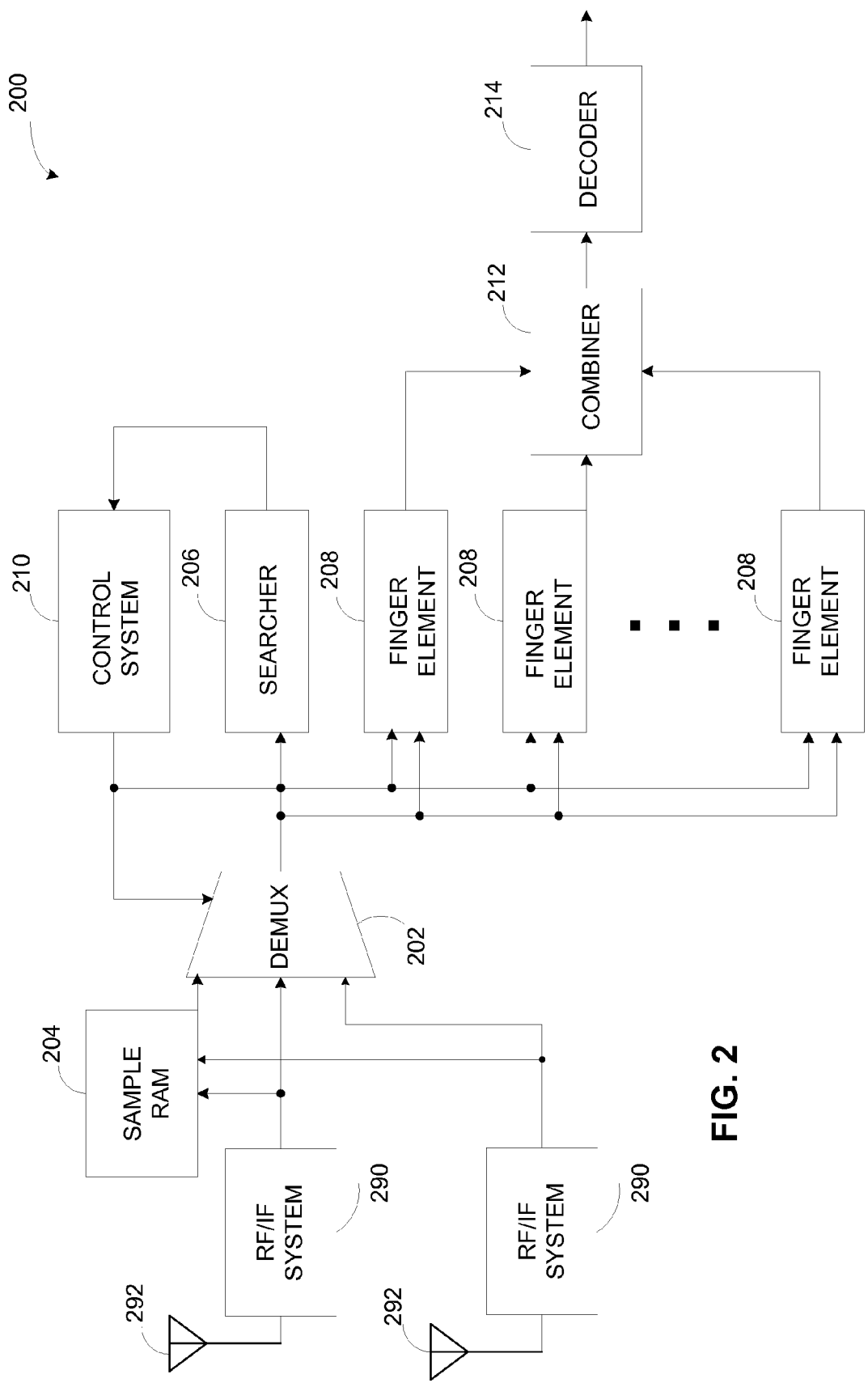
FIG. 2 illustrates a communication system receiver for receiving and decoding received data at a data rate in accordance with various aspects of the invention.

FIG. 2 illustrates a block diagram of a receiver 200 used for processing and demodulating the received CDMA signal. Receiver 200 may be used for decoding the information on the reverse and forward link signals. Received (Rx) samples may be stored in RAM 204. Received samples are generated by a radio frequency/intermediate frequency (RF/IF) system 290 and an antenna system 292. The RF/IF system 290 and antenna system 292 may include one or more components for receiving multiple signals and RF/IF processing of the received signals for receiving diversity gain. Multiple received signals may be from a common source that have propagated through different propagation paths. Antenna system 292 receives the RF signals, and passes the RF signals to RF/IF system 290. RF/IF system 290 may be any conventional RF/IF receiver. The received RF signals are filtered, down-converted and digitized to form Rx samples at base band frequencies. The samples are supplied to a demultiplexer (demux) 202. The output of demux 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with a turbo decoder or any other suitable algorithms.

During operation, received samples are supplied to demux 202. Demux 202 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art.

Receiver 200 may be used in a receiver portion of base stations 101 and 160 for processing the reverse link signals. Receiver 200 may search for reverse link signals by searching for the signals. If an adequate level of signal to noise and interference energy ratio ($Eb/(No+Io)$ or $Ec/(No+Io)$) is present, receiver 200 may lock at least one of the fingers 208 for demodulation of the reverse link signal. All fingers may be locked onto the received signals propagated through different paths. In another case, one or more signals may be strong while other signals, received through different propagation paths, are weak for locking a finger. The $Eb/(No+Io)$ or $Ec/(No+Io)$ of such signals is generally low. In another case, the $Eb/(No+Io)$ or $Ec/(No+Io)$ of all the signals is low such that no finger may be assigned to the received signals. For determining the reverse link load, the total reverse link $Eb/(No+Io)$ or $Ec/(No+Io)$ is necessary for an accurate estimation of the reverse link capacity. Therefore, in accordance with various embodiments of the invention, the level of the $Eb/(No+Io)$ or $Ec/(No+Io)$ of the signals from a mobile station at each locked finger is determined by receiver 200. The signals from a mobile station normally propagate through different paths before being received at receiver 200 at a base station. The signals propagated through certain paths provide sufficient $Eb/(No+Io)$ or $Ec/(No+Io)$ at the fingers which allow the fingers to lock to the signals. Other signals may propagate through other paths that may result in poor signal quality at the fingers and cause the finger to remain unlock. The $Eb/(No+Io)$ or $Ec/(No+Io)$ of the signals propagated through unused paths is determined and compared to a threshold. If the $Eb/(No+Io)$ or $Ec/(No+Io)$ meets the threshold, the received $Eb/(No+Io)$ or $Ec/(No+Io)$ is used in the determination of the total reverse link load even though the signal is not at a locked finger. After determining the reverse link load in accordance with various embodiments of the invention, the reverse link scheduler may determine more accurately the allowed reverse link data rate for each mobile station. The allowed reverse link data rate is communicated to the mobile station. The mobile station uses the allowed reverse link data rate information to adjust the data rate on a reverse link communication with the base station.

Figure 3:
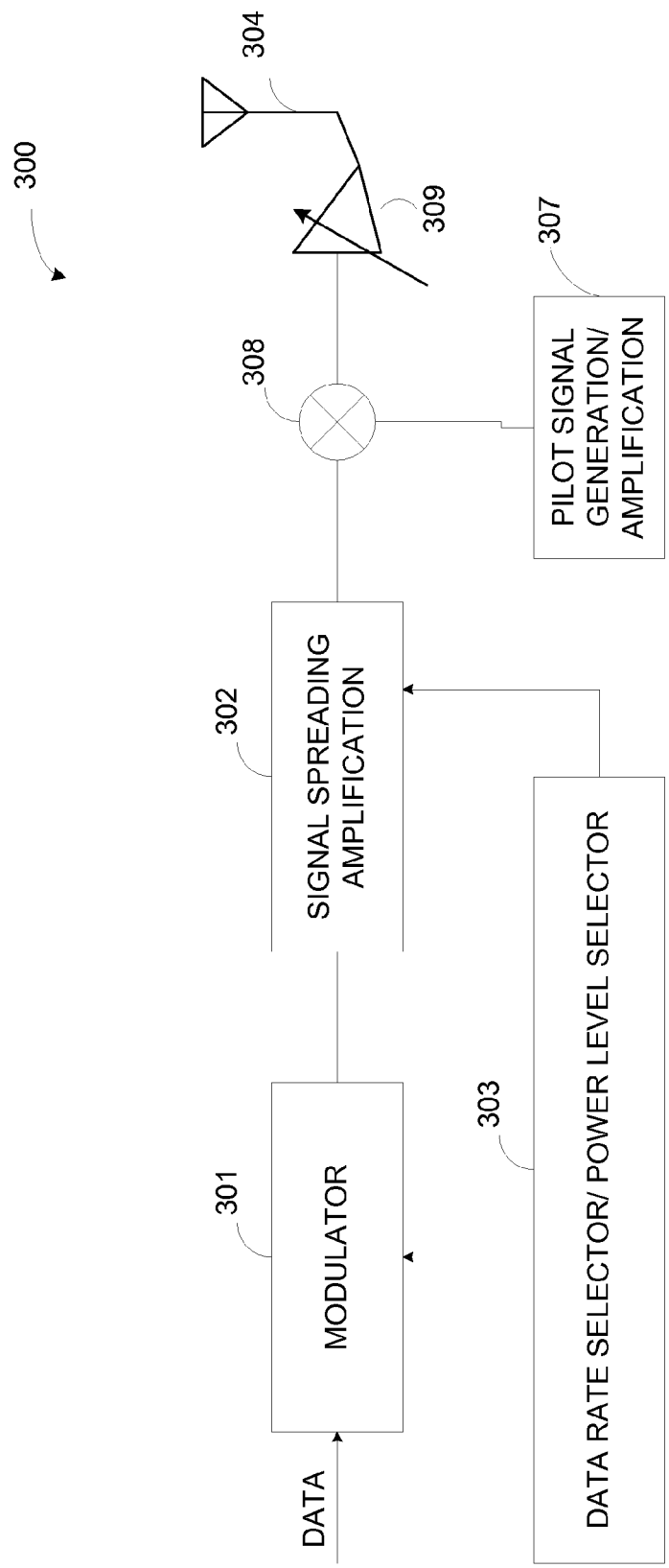
FIG. 3 illustrates a communication system transmitter for transmitting data packets at a scheduled data rate in accordance with various aspects of the invention.

FIG. 3 illustrates a block diagram of a transmitter 300 for transmitting the reverse and forward link signals. A traffic channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. For the reverse link signals, the data rate selection may be based on feedback information from a receiving base station. The information may include the maximum allowed data rate communicated by the receiving base station. The maximum allowed data rate may be determined in accordance with various embodiments of the invention. The data rate and power level selector 303 accordingly selects the data rate in modulator 301. The output of modulator 301 passes through a signal spreading operation and is amplified in a block 302 for transmission from an antenna 304. A pilot signal is also generated in a block 307. The pilot signal is amplified to an appropriate level in block 307. The pilot signal power level may be in accordance with the channel condition at a receiving base station. The pilot signal is combined with the traffic channel signal in a combiner 308. The combined signal may be amplified in an amplifier 309 and transmitted from antenna 304. The antenna 304 may be in any number of combinations including antenna arrays and multiple input multiple output configurations. The data rate and power level selector 303 also selects a power level for the amplification level of the transmitted signal in accordance with the feedback information. The combination of the selected data rate and the power level allows proper decoding of the transmitted data at the receiving base station.

Figure 4:
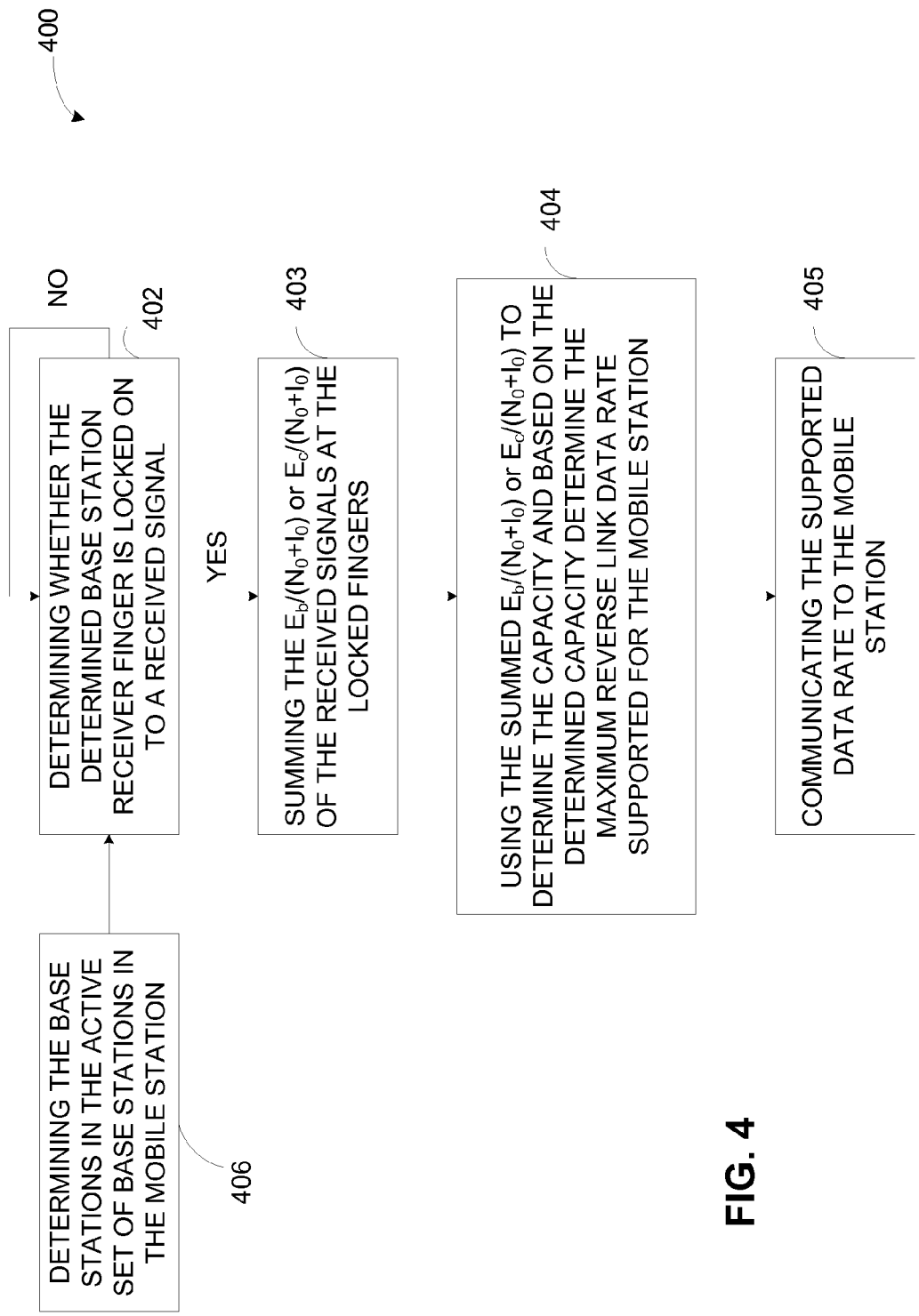
FIGS. 4 and 5 illustrate various flow charts for determining reverse link capacity and a maximum reverse link data rate for use by a mobile station in accordance with various embodiments of the invention.

Referring to FIG. 4, a process flow chart 400 depicts a process flow for determining the maximum reverse link data rate supported at a base station for a mobile station. At step 406, the base stations in the Active set of base stations are determined. At step 402, a control system, such as control system 210, determines if any one of the fingers 208 is locked onto the received reverse link signal at the determined Active set of base stations. At step 403, the $Eb/(No+Io)$ or the $Ec/(No+Io)$ of the received signals at the locked fingers are summed to produce a summed $Eb/(No+Io)$ or a summed $Ec/(No+Io)$. The locked fingers may be at different base stations in the Active set of base stations. At step 404, the summed $Eb/(No+Io)$ or a summed $Ec/(No+Io)$ may be used to determine the reverse link capacity. Moreover, based on the determined reverse link capacity, the maximum reverse link data rate supported for the mobile station is determined. At step 405, the determined data rate is then communicated to the mobile station. In a system with reverse link pilots, the summed $Eb/(No+Io)$ or a summed $Ec/(No+Io)$ of the reverse link pilot signal of the mobile station may be used for determining the reverse link capacity.

Figure 5:
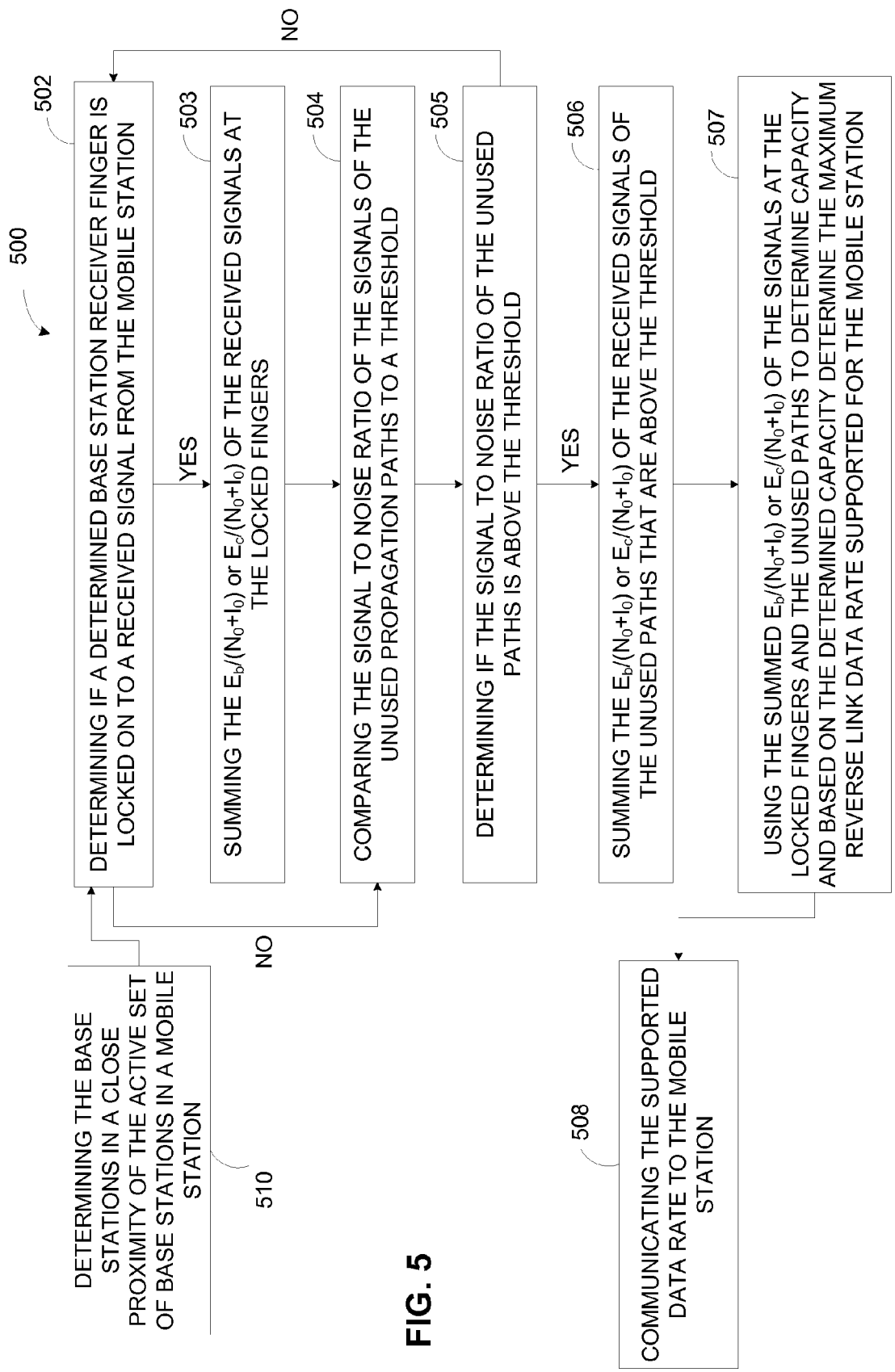

Referring to FIG. 5, a process flow chart 500 depicts a process flow for determining the maximum reverse link data rate supported at a base station for a mobile station in accordance with various embodiments of the invention. At step 510, the base stations that are in close proximity to the Active set base stations are determined. At step 502, a control system, such as control system 210, determines if one of the fingers 208 is locked onto the received reverse link signal at the determined base stations and the base stations in the Active set of base stations. At step 503, $Eb/(No+Io)$ or a summed $Ec/(No+Io)$ of the received signals at the locked fingers are summed to produce a summed $Eb/(No+Io)$. If no fingers is locked, the process flow 500 moves directly to step 504. At step 504, the $Eb/(No+Io)$ or $Ec/(No+Io)$ of the received signals, at the determined base stations and the base stations in the Active set of base stations of the unused paths is compared to a threshold. At step 505, the process flow 500 determines if any of the unused paths $Eb/(No+Io)$ or $Ec/(No+Io)$ are above the threshold. At step 506, the $Eb/(No+Io)$ or $Ec/(No+Io)$ of the signals propagated through the unused paths that are above the threshold are summed. At step 507, the summed $Eb/(No+Io)$ or summed $Ec/(No+Io)$ at the locked fingers and the summed $Eb/(No+Io)$ or summed $Ec/(No+Io)$ of the unused paths, in combination, may be used to determine the reverse link capacity. Moreover, based on the determined reverse link capacity, the maximum reverse link data rate supported for the mobile station is determined. At step 508, the determined data rate is then communicated to the mobile station. The mobile station uses the communicated data rate to adjust the data rate on a reverse link communication with the base station.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, a method comprising:
  determining a number of locked fingers on a reverse link signal in a receiver portion of a base station;
  summing energy per bit or carrier energy over noise plus interference ratio of said reverse link signal at said locked fingers;
  determining a reverse link capacity in said communication system based on said summed energy per bit or carrier energy over noise plus interference ratio;
  determining, based on said determined reverse link capacity, a maximum reverse link data rate supported for a mobile station for reverse link communication with said base station.

2. The method as recited in claim 1 further comprising:
  communication said maximum reverse link data rate to said mobile station.

3. The method as recited in claim 2 further comprising:
  adjusting a reverse link data rate from said mobile station to said base station based on said maximum reverse link data rate.

4. In a communication system, a method comprising:
  determining a number of locked fingers on a reverse link signal in a receiver portion of a base station;
  summing energy per bit or carrier energy over noise plus interference ratio of said reverse link signal at said locked fingers; and
  determining a reverse link capacity said communication system based on said summed energy per bit or carrier energy over noise plus interference ratio;
  comparing, to a threshold, energy per bit or carrier energy over noise ratio of said signal propagated through unused paths at said receiver of said base station;
  summing the energy per bit or carrier energy over noise plus interference ratio of said signals meeting said threshold; and
  determining said reverse link capacity based on said summed energy per bit or carrier energy over noise plus interference ratio.

5. In a communication system, a method comprising:
  determining a set of base stations in an Active set of base stations in a mobile station and in close proximity of said Active set of base stations;
  determining a number of locked fingers on a reverse link signal in a receiver portion of said determined set of base stations;
  summing energy per bit or carrier energy over noise plus interference ratio of said reverse link signal at said locked fingers; and
  determining a reverse link capacity in said communication system based on said summed energy per bit or carrier energy over noise plus interference ratio.

6. The method as recited in claim 5 further comprising:
  determining a maximum reverse link data rate supported for said mobile station for reverse link communication with said determined base stations.

7. The method as recited in claim 6 further comprising:
  communicating said maximum reverse link data rate to said mobile station.

8. The method as recited in claim 7 further comprising:
  adjusting a reverse link data rate from said mobile station to at least one of said determined set of base stations based on said maximum reverse link data rate.

9. The method as recited in claim 5 further comprising:
comparing, to a threshold, energy per bit or carrier energy ever noise plus interference ratio of said signal propagated through unused paths at said receiver at said determined base stations;
summing the energy per bit or carrier energy over noise plus interference ratio of said signals propagated Through unused paths meeting said threshold; and
determining said reverse link capacity based on said summed energy per bit or carrier energy over noise plus interference ratio.

10. In a communication system, an apparatus comprising:
a control system configured for determining a number of locked fingers on a reverse link signal in a receiver portion of a base station, summing energy per bit or carrier energy over noise plus interference ratio of said signal at said locked fingers, and determining a reverse link capacity based on said summed energy per bit or carrier energy over noise plus interference ratio;
wherein said control system is configured for determining, based on said determined reverse link capacity, a maximum reverse link data rate supported for a mobile station for reverse link communication with said base station.

11. The apparatus as recited in claim 10 further comprising:
a transmitter configured for communicating said maximum reverse link data rate to said mobile station.

12. The apparatus as recited in claim 11 further comprising:
a control system in said mobile station configured for adjusting a reverse link data rate with said base station based on said maximum reverse link data rate.

13. In a communication system, an apparatus comprising:
a control system configured for determining a number of locked fingers on a reverse link signal in a receiver portion of a base station, summing energy bit or carrier energy over noise plus interference ratio of said signal at said locked fingers, and determining a reverse link capacity based on said summed energy per bit or carrier energy over noise plus interference ratio;
wherein said control system is configured for comparing, to a threshold, energy per bit or carrier energy over noise plus interference ratio of said reverse link signal propagated through unused paths at said receiver of said base station, summing the energy per bit or carrier energy over noise plus interference ratio of said signal propagated through unused paths meeting said threshold, and determining said reverse link capacity based on said summed energy per bit or carrier energy over noise plus interference ratio.

14. A processor comprising:
means for determining a number of locked fingers on a reverse link signal in a receiver portion of a base station;
means for summing energy per bit or carrier energy over noise plus interference ratio of said reverse link signal at said locked fingers; and
means for determining a reverse link capacity in said communication system based on said summed energy per bit or carrier energy over noise plus interference ratio
means for determining, based on said determined reverse link capacity, a maximum reverse link data rate supported for a mobile station for reverse link communication with said base station.

15. The processor as recited in claim 14 further comprising:
means for communicating said maximum reverse link data rate to said mobile station.

16. The processor as recited in claim 15 further comprising:
means for adjusting a reverse link data rate from said mobile station to said base station based on said maximum reverse link data rare.

17. A processor comprising:
means for determining a number of locked fingers on a reverse link signal in a receiver portion of a base station;
means for summing energy per bit or carrier energy over noise plus interference ratio of said reverse link signal at said locked fingers; and
means for determining a reverse link capacity in said communication system based on said summed energy per bit or carrier energy over noise plus interference ratio
means for comparing, to a threshold, energy per bit or carrier energy over noise ratio of said signal propagated through unused paths at said receiver of said base station;
means for summing the energy per bit or carrier energy over noise plus interference ratio of said signals propagated through unused paths meeting said threshold; and
means for determining said reverse link capacity based on said summed energy per bit or carrier energy over noise plus interference ratio.

18. In a communication system, a method comprising:
determining a number of base stations in an active set of a mobile station;
determining a number of geographically close base stations within a predetermined radius of said active set of base stations;
determining a number of locked fingers on a reverse link signal in a receiver portion of said geographically close base stations and said active set of base stations;
summing energy per bit or carrier energy over noise plus interference ratio of signals at said locked fingers; and
determining a reverse link capacity in said communication system based on said summed energy per bit over noise plus interference ratio.

19. The method as recited in claim 18 further comprising:
determine a maximum reverse link data rate supported for said mobile station for reverse link communication with at least one of the base stations in said active set of base stations arid said geographically close base stations.

20. The method as recited in claim 19 further comprising:
communicating said maximum reverse link data rate to said mobile station.

21. The method as recited in claim 20 further comprising:
adjusting a reverse link data rare from said mobile station to at least one of said geographically close base stations and active set of base stations based on said maximum reverse link data rate.

22. The method as recited in claim 18 further comprising:
comparing, to a threshold, energy per bit or carrier energy over noise ratio of said signal propagated through unused paths at said receiver of said active set of base stations;
summing the energy per bit or carrier energy over noise plus interference ratio meeting said threshold; and
determine said reverse link capacity based on said summed energy per bit over noise ratio.

* * * * *

UNITED STATES PATENT AND TRADEMARK OFFICE
CERTIFICATE OF CORRECTION

PATENT NO. : 7,245,600 B2  Page 1 of 1
APPLICATION NO. : 10/011519
DATED : July 17, 2007
INVENTOR(S) : Chen It is certified that error appears in the above-identified patent and that said Letters Patent is hereby corrected as shown below:

Title of the patent, please change (54) from
"METHOD AND APPARATUS FOR DETERMINING REVERSE LINK LOAD LEVEL FOR REVERSE LINK DATA SCHEDULING IN A CDMA COMMUNICATION SYSTEM" to --METHOD AND APPARATUS FOR DETERMINING REVERSE LINK LOAD LEVEL FOR REVERSE LINK DATA RATE SCHEDULING IN A CDMA COMMUNICATION SYSTEM--

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,245,600 B2 |
| APPLICATION NO. | : 10/011519 |
| DATED | : July 17, 2007 |
| INVENTOR(S) | : Chen |

It is certified that error appears in the above-identified patent and that said Letters Patent is hereby corrected as shown below:

Title of the patent, please change (54) and Column 1, lines 1-5 from "METHOD AND APPARATUS FOR DETERMINING REVERSE LINK LOAD LEVEL FOR REVERSE LINK DATA SCHEDULING IN A CDMA COMMUNICATION SYSTEM" to --METHOD AND APPARATUS FOR DETERMINING REVERSE LINK LOAD LEVEL FOR REVERSE LINK DATA RATE SCHEDULING IN A CDMA COMMUNICATION SYSTEM--

This certificate supersedes the Certificate of Correction issued April 8, 2008.

Signed and Sealed this

Sixth Day of May, 2008

JON W. DUDAS
*Director of the United States Patent and Trademark Office*